United States Patent
Jean et al.

(10) Patent No.: US 8,176,427 B2
(45) Date of Patent: May 8, 2012

(54) METHOD FOR CONFIGURING A DEVICE USING SIMPLE PICTOGRAMS

(75) Inventors: Sebastien A. Jean, Irvine, CA (US); Swee Huat Sng, Torrance, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 596 days.

(21) Appl. No.: 11/614,633

(22) Filed: Dec. 21, 2006

(65) Prior Publication Data

US 2008/0155402 A1    Jun. 26, 2008

(51) Int. Cl.
*G06F 15/177* (2006.01)

(52) U.S. Cl. ......................... 715/735; 715/853

(58) Field of Classification Search .................. 715/735, 715/853
See application file for complete search history.

(56) References Cited

U.S. PATENT DOCUMENTS

| | | | |
|---|---|---|---|
| 5,515,307 A * | 5/1996 | Aiello et al. .................. 708/254 |
| 6,332,192 B1 | 12/2001 | Boroditsky et al. | |
| 6,351,634 B1 * | 2/2002 | Shin .............................. 455/410 |
| 6,571,336 B1 | 5/2003 | Smith, Jr. | |
| 7,036,016 B1 | 4/2006 | Smith, Jr. | |
| 7,426,550 B2 * | 9/2008 | Abhishek et al. ............. 709/220 |
| 2002/0188872 A1 * | 12/2002 | Willeby ........................ 713/202 |
| 2005/0239445 A1 * | 10/2005 | Karaoguz et al. .......... 455/414.1 |
| 2006/0095794 A1 | 5/2006 | Nunnelley | |
| 2006/0173976 A1 * | 8/2006 | Vincent et al. ................ 709/220 |
| 2006/0285692 A1 * | 12/2006 | Kerstens et al. .............. 380/270 |
| 2007/0002373 A1 * | 1/2007 | Yamada ....................... 358/1.15 |
| 2007/0113186 A1 * | 5/2007 | Coles et al. ................... 715/735 |
| 2008/0127339 A1 * | 5/2008 | Swain et al. .................... 726/22 |

* cited by examiner

*Primary Examiner* — Boris Pesin
*Assistant Examiner* — Andres E Gutierrez
(74) *Attorney, Agent, or Firm* — Canon U.S.A., Inc. I.P. Division

(57) ABSTRACT

A method for a user to easily securely configure a device is provided. The method includes displaying a user interface including a plurality of symbols available for user selection, accepting user inputs including an indication of any symbols selected by the user, converting the symbols selected by the user into numeric data, and assigning the numeric data to configuration parameters for the device.

18 Claims, 4 Drawing Sheets

METHOD FOR CONFIGURING A DEVICE USING SIMPLE PICTOGRAMS

BACKGROUND OF THE INVENTION

1. Field of the Invention

The present invention relates generally to configuration of devices, and more particularly to a method for configuring a device using simple pictograms.

2. Description of the Related Art

Devices, for example, network devices require setting of configuration parameters. For example, currently, users must enter several configuration parameters to get 802.11 wireless enabled (WiFi) devices on a network. This approach requires users to: pick a channel, name the service set identifier (SSID) and set up the security parameters. This can be confusing to users. Therefore, devices are often left with their default configuration settings. This creates a very vulnerable network.

It is difficult for a user to easily configure a device. For example, it is difficult for a user to easily configure a WiFi device easily in both ad-hoc and infrastructure modes for 802.11 networks. This is compounded for devices that do not have a keyboard or have a limited keyboard. This is further exacerbated when these devices are mobile and introduced to many new networks.

An example of this is the configuration of a WiFi enabled digital camera. Introducing the camera to a new network requires that one of two methods be used: 1) enter the information one character at a time using the limited user interface (UI); or 2) transmit the information out-of-band using a universal serial bus (USB) or a key/card token. As mentioned above, the first method is difficult for users. As such, users typically do not change the configuration parameters from their default settings. The second method requires additional infrastructure and cost. Security is a concern using such conventional methods.

Thus, there is a need for a method for configuring devices that is user-friendly, reasonably inexpensive and secure.

SUMMARY OF THE INVENTION

The present invention addresses the above-described problems. The present invention provides an easy to use user interface that allows a user to easily and rapidly set parameters for a device without even knowing the configuration parameters for the device. The user simply selects symbols from a symbol list. The symbols are converted to a string of numeric data (bits), which are then parsed and allocated to the configuration parameters.

According to an aspect of the present invention, a method for configuring a device includes: displaying a user interface including a plurality of symbols available for user selection; accepting user inputs including an indication of any symbols selected by the user; converting the symbols selected by the user into numeric data; parsing the numeric data; and assigning the parsed numeric data to configuration parameters for the device.

According to another aspect of the present invention, a device includes: a display unit capable of displaying a plurality of symbols; a user input unit capable of selecting symbols displayed on the display device; and a processor capable of converting the symbols selected by the user into numeric data and assigning the numeric data to configuration parameters for the device.

DETAILED DESCRIPTION OF THE EMBODIMENTS

According to exemplary embodiments of the present invention, a personal identification number (PIN) can be generated on a device's screen using symbols or pictograms. These symbols can be pictures, alphabetic characters and/or numbers. Simple up/down arrows can be used to toggle between the available symbols. As described in further detail below, these symbols are then converted to numeric values. This can be done in various ways, for example, by assigning each symbol a unique numeric value. A numeric string (bits) is then generated from the numeric values for the symbols selected by the user. For example, the symbols are input into an algorithm which generates a numeric string (bits). The numeric string (bits) are then parsed and allocated to the configuration parameters. The values for the configuration parameters can include predefined data, e.g., prefixes and/or suffixes, in conjunction with the numeric data parsed from the numeric data string.

Configuration of a digital camera is described herein as an example. However, it will be appreciated that the method of the present invention can be used in many applications. The method described herein generates numeric data for allocation as values for parameters. The numeric data is produced from user selected graphic data, such as symbols or icons. The values to be used for the parameters can be numeric data or string data based on the numeric data generated. Such string data may include alphanumeric and special characters in addition to the numeric characters. Such alphanumeric and/or special characters can be predefined to be appended as prefix and/or suffix data to be used in conjunction with the numeric data obtained based on the user-selected symbols.

Figure 1:
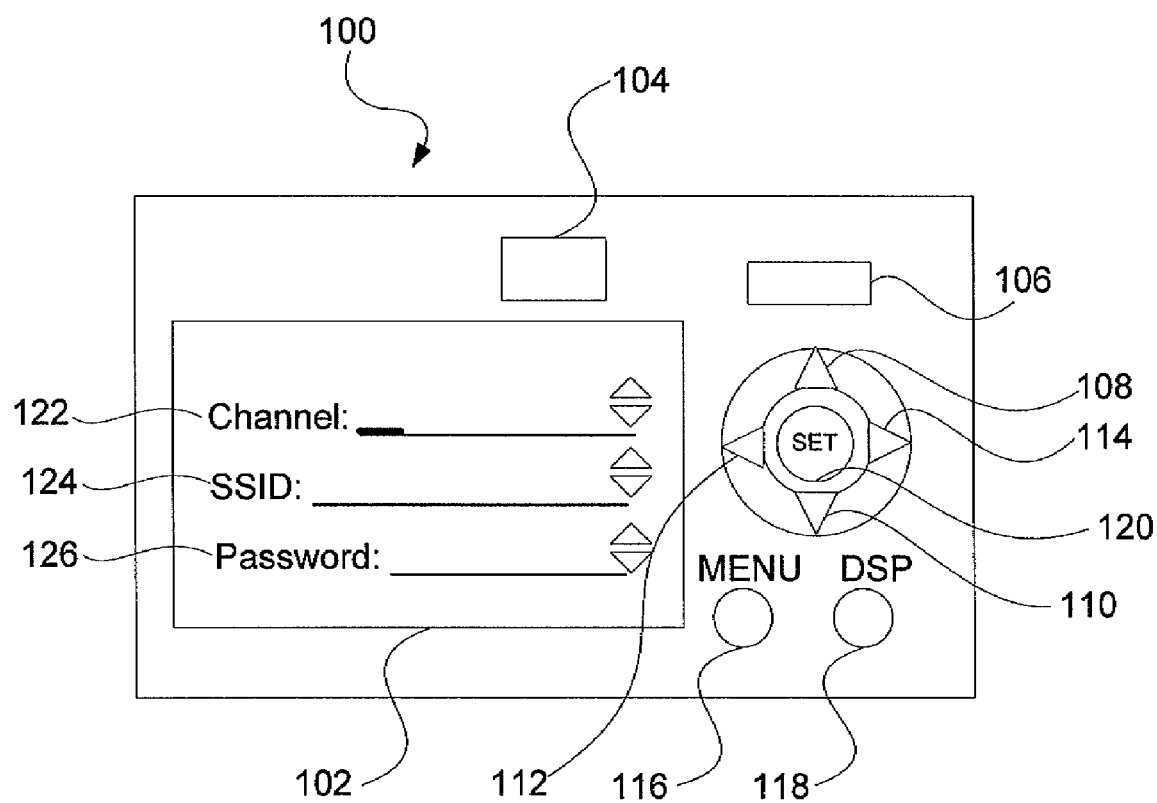
FIG. 1 illustrates the back of an exemplary digital camera with a display showing a conventional menu for entry of device configuration parameters.

FIG. 1 illustrates the back of an exemplary digital camera 100. The digital camera 100 shown in FIG. 1 includes a display, e.g., a liquid crystal display (LCD) 102, a viewfinder 104, and a mode selection control 106 for selecting between a shooting mode and a viewing mode. The digital camera 100 further includes an up arrow button 108, a down arrow button 110, a left arrow button 112, a right arrow button 114, a menu button 116, a display button 118 and a set button 120.

The LCD 102 is used to view images. The LCD is also used to display information so that a user can view and modify various parameters for the device. This is typically done in a menu fashion. For example, a user may depress the menu button 116. A main menu is then displayed on the LCD 102. The user can then use the direction buttons (e.g., up arrow button 108 and down arrow button 110) to select a menu item. After scrolling to the desired menu item, the user can scroll through a list of options (e.g., using the arrow buttons) for that particular menu item and select the desired value.

The LCD 102 shown in FIG. 1 illustrates an exemplary user interface for entering 802.11 configuration parameters in a conventional manner. Such conventional configuration requires entry of a channel 122, an SSID 124 and a password 126. For example, the channel is selected from a value between 0 and 15. The service set identifier (SSID) is a sequence of characters (e.g., from 1-32 characters) that uniquely names a wireless local area network (WLAN). This name allows stations to connect to the desired network when multiple independent networks operate in the same physical area. The password is a character string that can be set by the user for security.

Entry of the configuration parameters in the conventional manner shown in FIG. 1 is difficult on a device, such as a digital camera, having limited data entry capabilities. In order to enter this information, the user has to first get to the appropriate menu. Then, the user has to select the channel menu item and scroll through the digits 0-9 to select the first digit of the channel. This is repeated for each digit of the channel. The user then selects the SSID menu option and selects the first digit, etc. The same procedure is then repeated for the password.

Due to this difficulty, default settings are typically provided for the configuration parameters. Such settings are not secure. However, users typically do not change from the default settings due to the difficulty in changing the settings using a conventional manner such as that illustrated in FIG. 1.

Figure 2:
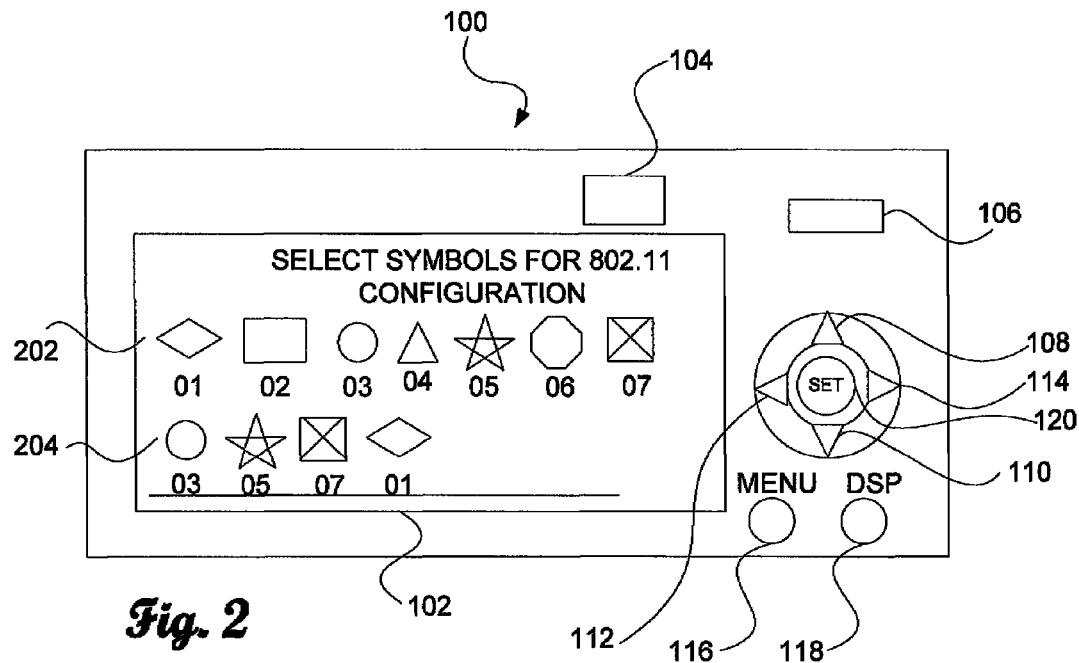
FIG. 2 illustrates the back of a digital camera with a display for entry of device configuration parameters according to an exemplary embodiment of the present invention.

FIG. 2 illustrates the back of a digital camera with a display for entry of device configuration parameters in the form of a PIN composed of a series of symbols according to an exemplary embodiment of the present invention.

Figure 4:
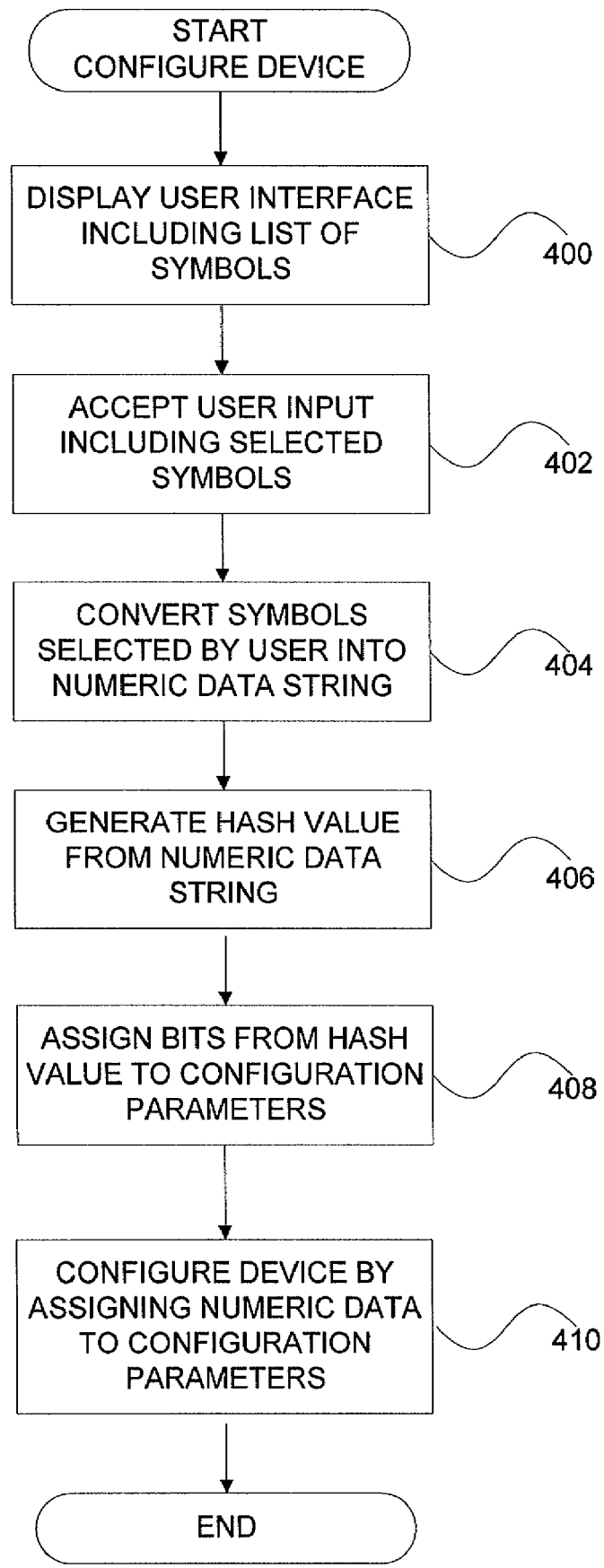
FIG. 4 is a data flow diagram illustrating an exemplary method for configuring a device such as that shown in FIG. 2.

FIG. 4 is a data flow diagram illustrating an exemplary method of performing device configuration.

The method shown in FIG. 4 is described next with reference to the exemplary display shown in FIG. 2.

First, in step 400, a user interface is displayed showing a list of available symbols (icons).

The exemplary display shown in FIG. 2 includes a list of available symbols (icons) 202. In the example shown, the list of icons includes seven icons, a diamond, a rectangle, a circle, a triangle, a star, an octagon and a square with an 'X'. This is merely an example, different icons can be used and a different number of icons can be included in the list. While the example shown and described herein use graphical symbols, it will be appreciated that the icons can also include alphabetic and/or numeric characters in addition to or instead of graphic data.

The icons used should be vivid, distinct and easy to remember. Furthermore, the list of available icons should be long enough to provide for several options, yet short enough that the user does not have to scroll through several menus of icons. For example, if the display allows for sufficient room for displaying six icons at a time, a list of 12-18 is sufficient to allow the user a sufficient selection while only having to scroll through two or three screens at most.

Next in step 402, a user selects a PIN 204 composed of symbols (icons) from the list of available symbols 202 displayed in step 400. The user then indicates completion of entry, for example via a set key 120.

Selection of a PIN composed of three or four symbols is easy for the user to enter and remember, yet will allow for the desired security. In exemplary embodiments, the selected icons 204 are displayed on the LCD 102. In the example shown, the user has selected a circle, a star, a square with 'X' and a diamond.

As can be seen from the example, the user can easily select a pattern of symbols. The user does not need to select specific configuration parameters, such as channel, SSID and password as with the conventional method. The user only needs to select a few icons in a desired order.

Next, in step 404, the string of selected symbols is converted into numeric data. Each of the symbols has an associated numeric value. The associated value may also be displayed on the LCD 102. For example, in FIG. 2, the diamond has a value of 01, the rectangle has a value of 02, etc.

Next, in step 406, a value is generated from the numeric string determined in step 404. The string of symbols is input to an algorithm. For example, the value may be a hash value generated by a hash algorithm. For example, MD5 can be used as the hash algorithm. MD5 (Message-Digest algorithm 5) is a widely used cryptographic hash function with a 128-bit hash value. As an Internet standard (RFC 1321), MD5 has been employed in a wide variety of security applications, and is also commonly used to check the integrity of files. An MD5 hash is typically a 32-character hexadecimal number. It will be appreciated that other hashing algorithms can be used. For example, SHA-1 may be used as the hashing algorithm. It will also be appreciated that the numeric value does not need to be generated by a hashing algorithm. The algorithm converts the input numeric string into a numeric value (bits). For example, in the example of an MD5 hashing algorithm, the output value is an MD5 hash value. In the case of MD5, the hash value is 160 bits.

After performing the hash algorithm, the hash value is parsed up to fill in the values for the parameters in step 408. The bits of the hash value are allocated to the configuration parameters. For example, the first four bits are assigned to the channel number, the next 48 bits are assigned to the SSID and the remaining (108) bits are assigned as the password.

In exemplary embodiments, the user may be prompted for multiple groups of symbols, e.g., two or three groups of selected symbols. For example, 03, 05, 07, 01/23, 19, 08, 14/04, 06, 11, 16. The groups of symbols are input to the hashing algorithm. As described above, the bits of the returned hash value are then distributed among the various configuration parameters, for example:

Channel: 4
SSID: 345-909
Password: 1A34-B1AF-6432

Figure 3:
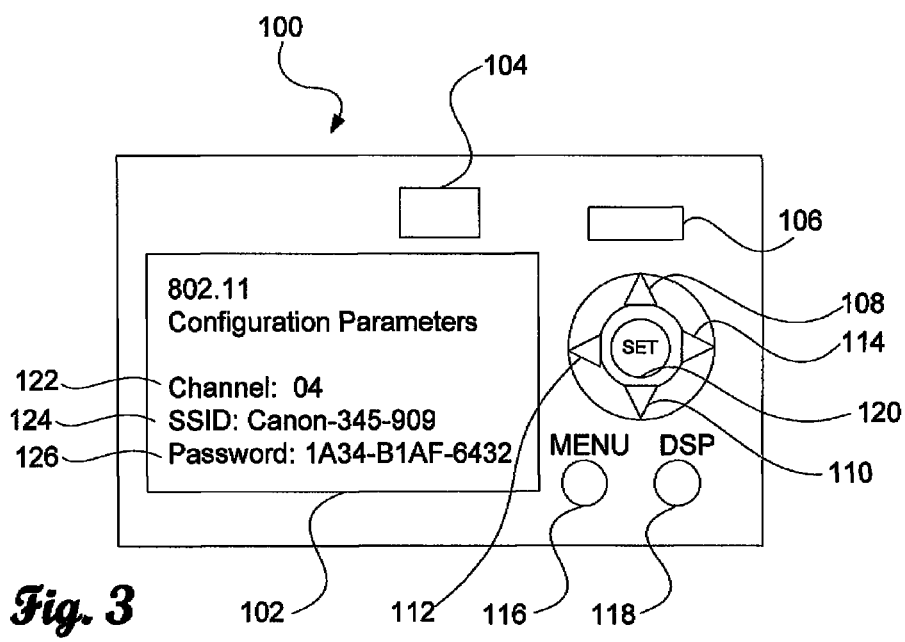
FIG. 3 illustrates the back of a digital camera after a user has performed device configuration by selecting symbols such as shown in FIG. 2.

The SSID may also include text, for example a prefix and/or a suffix, for example, Canon-345-909, as shown in FIG. 3. Although the example shown includes only prefix data for one of the configuration parameters, it will be appreciated that prefix and/or suffix data or neither prefix nor suffix data can be appended to any combination of configuration parameters.

In exemplary embodiments, after assigning the data in step 408, the configuration parameters, e.g., such as those shown above, are displayed on the LCD, for example, as shown in FIG. 4.

In exemplary embodiments, the user can print the configuration parameters.

Next, in step 410, the device is configured using the configuration data determined in step 408.

In exemplary embodiments, the configuration is stored and can easily be retrieved by the user, for example, under a tab labelled 'advanced'. After retrieving the data, the user can view the configuration data on the LCD 102, for example, as shown in FIG. 4. As described above, in exemplary embodiments, the user can also transmit the data to a printing device and print the configuration data. The user can also modify the configuration data after retrieving it, i.e., perform the method illustrated in FIG. 4 and described above.

The example described above relates to a single user configuring his/her device. However, the present application is not limited to this. This method can also be used to set up ad-hoc networks between two devices, e.g., two mobile devices. For example, two users may meet and decide that they would like to exchange contact data or files between their two devices.

Figure 5:
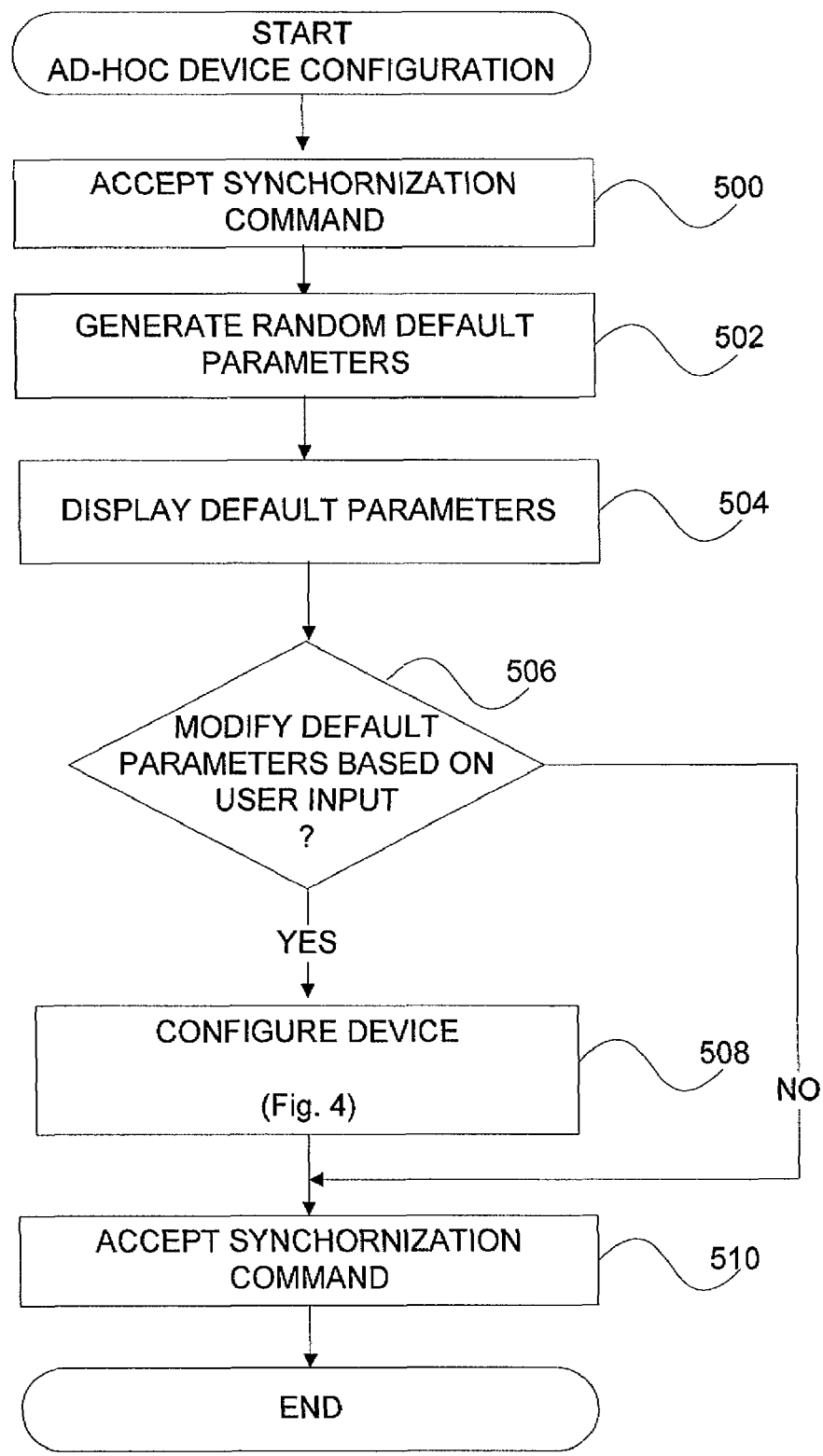
FIG. 5 is a data flow diagram illustrating an ad-hoc device configuration method performed by the devices in an ad-hoc network.

FIG. 5 is a data flow diagram showing a method performed by a first user, e.g., a leader, and a second user, e.g., follower, in creating the ad-hoc network.

First, in step 500, each of the users (first user and second user) presses a synch button on his or her device to be configured. Upon receiving the synch request, each of the respective devices generates random default parameters in step 502. The default parameters generated in step 502 are displayed on the respective device in step 504. Such a display could be in the form of a list of symbols, such as shown in FIG. 2.

Next, in step 506, one or both users can change the default parameters. In such a case, the leader can either keep the randomly generated default parameters or change the parameters. The follower changes his or her parameters to match those of the leader.

If it is determined in step 506 that the parameters are to be changed, the process shown in FIG. 4 and described above is performed in order to configure the device based on user parameters. If the devices include the same symbols, the users can match based on symbols. However, it is not required that the two devices include the same symbol list. It will be appreciated that a list of numerical values only may be displayed instead of symbols and numbers. If both devices include the same algorithm for generating the configuration data, the second user can enter the numeric values and have them converted to the parameters using the algorithm. It will also be appreciated that if both devices do not include the algorithm that an ad-hoc network can still be configured by entering the parameters on the second user's device using conventional methods.

Once the second user has entered data to match that of the first user, the users each press the synch button, in step 510, and the system then establishes a secure ad-hoc network between both devices.

The present invention is fully compatible with the existing technology standards given that it produces standard values from the abstract data. This method doesn't require additional hardware (e.g., USB, Key/Token & reader). Therefore, this method is inexpensive.

The above-described method allows for easer user entry as symbols are easier to remember and more values can be plugged into each position. For example decimal allows 10 values, hexadecimal allows for 16 and the pictogram could allow for 25 or more.

The example described above is described with reference to a digital camera. However, the present invention is not limited to this. The present invention can be used for entering configuration parameters for any device, e.g., both desktop devices and mobile devices (such as WiFi enabled digital cameras, high-end displays or medical equipment). The method is particularly well-suited for devices having limited data entry capabilities, such as cameras, mobile phones, personal digital assistants (PDAs), blackberries®, remote controls, a user interface on a television display, etc.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

What is claimed is:

1. A method for configuring a device for wireless communication, the method comprising:
   a. displaying, on the device, a user interface including a plurality of symbols available for user selection in order to set wireless communication parameters comprising a network identifier that identifies a wireless network and other information;
   b. accepting, by the device, user inputs including an indication of a string of symbols selected by the user;
   c. converting, by the device, the string of symbols selected by the user into a numeric data string;
   d. assigning, by the device, the numeric data string to wireless communication parameters, wherein a first part of the numeric data string is assigned to the network identifier, and a second part of the numeric data string is assigned to the other information;
   e. configuring the device for wireless communication with the wireless communication parameters to which the numeric data string is assigned.
   f. wherein each symbol is a picture or pictogram.

2. The method of claim 1, further comprising:
   accepting user input for printing the displayed symbols; and
   transmitting a print request for printing the displayed symbols.

3. The method of claim 1, wherein the symbols are converted into the numeric data string using a hash algorithm.

4. The method of claim 3, wherein the hash algorithm is MD5.

5. The method of claim 1, wherein the device is a wireless enabled device.

6. The method of claim 1, wherein the other information of the wireless communication parameters includes a channel.

7. The method of claim 6, wherein the network identifier is a service set identifier.

8. The method of claim 7, wherein the other information of the wireless communication parameters includes a password.

9. The method of claim 1, further comprising storing the symbols selected by the user for future recall.

10. The method of claim 9, further comprising:
    accepting user input for recalling the stored symbols; and displaying the stored symbols.

11. The method of claim 10, further comprising:
    accepting user input for printing the displayed symbols; and
    transmitting a print request for printing the displayed symbols.

12. The method of claim 1, further comprising performing a synch function to synchronize with a second user having a second device where the second user has assigned the same numeric data string to wireless communication parameters for the second user's device so as to form a secure network.

13. The method of claim 1, further comprising appending predetermined prefix and/or suffix data to the part of the numeric data string for at least one of the wireless communication parameters before assigning the part of the numeric data string to the wireless communication parameters for the device.

14. A device comprising:
    a. a display unit capable of displaying a plurality of symbols in order to set wireless communication parameters comprising a network identifier that identifies a wireless network and other information;

b. a user input unit capable of accepting user input including an indication of a string of symbols selected by a user from the plurality of symbols displayed on the display device;

c. a processor capable of converting the string of symbols selected by the user into a numeric data string and assigning the numeric data string to wireless communication parameters, wherein a first part of the numeric data string is assigned to the network identifier, and a second part of the numeric data string is assigned to the other information, d. wherein the device performs communication wirelessly by configuring the device with the wireless communication parameters to which the numeric data string is assigned.

e. wherein the symbols are pictures or pictograms.

15. The device of claim 14, wherein the display unit is a limited-size display unit.

16. The device of claim 15, wherein the user input unit is a limited-size user input unit.

17. The device of claim 14, wherein the user input unit is a limited-size user input unit.

18. A non-transitory computer-readable medium having computer-executable instructions stored thereon for a device to perform a method for configuring the device, the computer-executable instructions stored on the computer-readable medium comprising:

a. instructions for the device to display a user interface including a plurality of symbols available for user selection, in order to set wireless communication parameters comprising a network identifier that identifies a wireless network and other information;

b. instructions for the device to accept user inputs including an indication of a string of symbols selected by the user;

c. instructions for the device to convert the string of symbols selected by the user into a numeric data string;

d. instructions for the device to assign the numeric data string to wireless communication parameters wherein a first part of the numeric data string is assigned to the network identifier, and a second part of the numeric data string is assigned to the other information, e. instructions for configuring the device to for wireless communication by configuring the device with the wireless communication parameters to which the numeric data string is assigned.

f. wherein the symbols are pictures or pictograms.

* * * * *